(12) United States Patent
Jozaki et al.

(10) Patent No.: US 7,104,907 B2
(45) Date of Patent: Sep. 12, 2006

(54) SYSTEM AND METHOD OF CONTROLLING AUTOMATIC TRANSMISSION

(75) Inventors: Tateki Jozaki, Kanagawa (JP); Shigeru Ishii, Kanagawa (JP); Tatsuo Ochiai, Kanagawa (JP)

(73) Assignee: JATCO Ltd, Fuji (JP)

( * ) Notice: Subject to any disclaimer, the term of this patent is extended or adjusted under 35 U.S.C. 154(b) by 535 days.

(21) Appl. No.: 10/674,091

(22) Filed: Sep. 30, 2003

(65) Prior Publication Data

US 2004/0063523 A1   Apr. 1, 2004

(30) Foreign Application Priority Data

Sep. 30, 2002 (JP) .............................. 2002-285496

(51) Int. Cl.
*F16H 61/02* (2006.01)
*F16H 61/662* (2006.01)

(52) U.S. Cl. ..................... 474/28; 474/18; 477/45; 477/98

(58) Field of Classification Search .................. 474/18, 474/28, 23, 46; 477/3, 98, 45–49; 701/60
See application file for complete search history.

(56) References Cited

U.S. PATENT DOCUMENTS

| | | | | |
|---|---|---|---|---|
| 4,998,449 A | * | 3/1991 | Baba et al. ................. | 477/98 |
| 5,218,540 A | * | 6/1993 | Ishikawa et al. ............. | 701/60 |
| 6,336,888 B1 | * | 1/2002 | Eguchi ....................... | 477/3 |
| 6,494,808 B1 | * | 12/2002 | Lee ............................ | 477/45 |
| 6,530,860 B1 | * | 3/2003 | Ui ............................. | 474/28 |
| 2001/0044350 A1 | * | 11/2001 | Nishigaya et al. ........... | 474/18 |
| 2002/0022547 A1 | * | 2/2002 | Hino .......................... | 477/45 |
| 2004/0157700 A1 | | 8/2004 | Katou | |

FOREIGN PATENT DOCUMENTS

| | | | | | |
|---|---|---|---|---|---|
| JP | 04-73457 A | * | 3/1992 | | 477/98 |
| JP | 06-229462 A | * | 8/1994 | | 477/98 |
| JP | 10-148252 A | * | 6/1998 | | |
| JP | 11-108171 A | * | 4/1999 | | |
| JP | 2003-207038 A | * | 7/2003 | | |

OTHER PUBLICATIONS

U.S. Appl. No. 10/674,069, filed Sep. 30, 2003, Sawada et al.
U.S. Appl. No. 10/664,031, filed Sep. 17, 2003, Yamamoto et al.
U.S. Appl. No. 10/670,270, filed Sep. 26, 2003, Nobu.
U.S. Appl. No. 10/670,271, filed Sep. 26, 2003, Nobu.
U.S. Appl. No. 10/662,442, filed Sep. 16, 2003, Ochiai et al.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.

* cited by examiner

*Primary Examiner*—Marcus Charles
(74) *Attorney, Agent, or Firm*—Foley & Lardner LLP

(57) ABSTRACT

In a system for controlling an automatic transmission, at the time of ultra-low temperature start with the oil temperature of –20° C. or less, control is carried out such that when the state that the actual line pressure is equal to or greater than an ultra-low set value continues for a period longer than a line-pressure low-pressure control command set time, it is determined that the line pressure is under regulation, maximizing an indicated value of the line pressure.

11 Claims, 8 Drawing Sheets

SYSTEM AND METHOD OF CONTROLLING AUTOMATIC TRANSMISSION

BACKGROUND OF THE INVENTION

The present invention relates to a control system for an automatic transmission, which is suitable, particularly, for start control of a V-belt type continuously variable transmission (CVT) at an ultra-low temperature.

In motor vehicles including an automatic transmission, a hydraulic system for transmission forms a drive load on a starter motor at engine start. At an ultra-low temperature of −20to −40° C., particularly, the oil viscosity is higher to increase the resistance of the whole hydraulic system, decreasing cranking rotational speed, leading to degradation of the engine start-ability.

In order to prevent such inconvenience, a typical control system for automatic transmission sets provisionally an indicated value of the line pressure at a minimum when a detected oil temperature is low at engine start, reducing a drive load on an oil pump, thus enhancing the engine start-ability. And when selecting a drive range during the minimum line-pressure control, the indicated value of the line pressure is set at a maximum as soon as the engine speed reaches a predetermined value, increasing the line pressure in a stroke, supplying the hydraulic pressure to engagement elements.

The maximum value of the line pressure is created by draining or reducing the source pressure of the oil pump to a "design maximum value" through a pressure regulating valve. The typical control system, which aims to enhance only the engine start-ability at the time of ultra-low temperature start, sets an indicated value of the line pressure at a maximum as soon as the engine speed reaches a predetermined value, having possible occurrence that the indicated value reaches a maximum before regulating the line pressure.

In that case, since the pressure regulating valve has a drain port closed before regulating the line pressure, and is not supplied with the hydraulic pressure enough to reduce the source pressure to the "design maximum value", the engagement elements of the transmission undergo a greater pressure than the "design maximum value". That is, an overshoot of the line pressure becomes greater with respect to the "design maximum value".

Typically, the strength of the engagement elements of the transmission, particularly, pulleys of the V-belt type transmission, is designed to have the "design maximum value" as an upper limit. Thus, when undergoing a greater pressure than the "design maximum value", the pulleys suffer deterioration of the durability.

SUMMARY OF THE INVENTION

It is, therefore, an object of the present invention to provide a system and method of controlling an automatic transmission, which contributes to an enhancement in the durability of the pulleys.

The present invention provides generally a system for controlling an automatic transmission, which comprises: a source of a line pressure; an oil-temperature sensor which senses a temperature of a transmission oil; an engine-speed sensor which senses an engine speed; a hydraulic-pressure sensing device which senses an actual value of the line pressure; a control circuit which controls the line pressure; and a control unit which controls the control circuit, the control unit being configured to: determine that engine cranking starts when the engine speed is greater than a predetermined speed; set as a low-pressure control set time a time required from start of engine cranking to completion of an overshoot of the line pressure due to increase in the engine speed; determine that the actual value of the line pressure is equal to or greater than a predetermined value; determine that the actual value as determined is held for a period longer than the low-pressure control set time; and provide first and second indicated values of the line pressure to the control circuit when the transmission-oil temperature at engine start is equal to or smaller than a predetermined temperature, the first indicated value being smaller than the second indicated value, the first indicated value being provided when at least a range other than a drive range is selected, the second indicated value being provided when the drive range is selected, the second indicated value being provided when it is determined that the actual value of the line pressure is equal to or greater than the predetermined value, and when it is determined that the actual value as determined is held for the period longer than the low-pressure control set time.

BRIEF DESCRIPTION OF THE DRAWINGS

The other objects and features will become apparent from the following description with reference to the accompanying drawings, wherein.

DETAILED DESCRIPTION OF THE INVENTION

Figure 1:
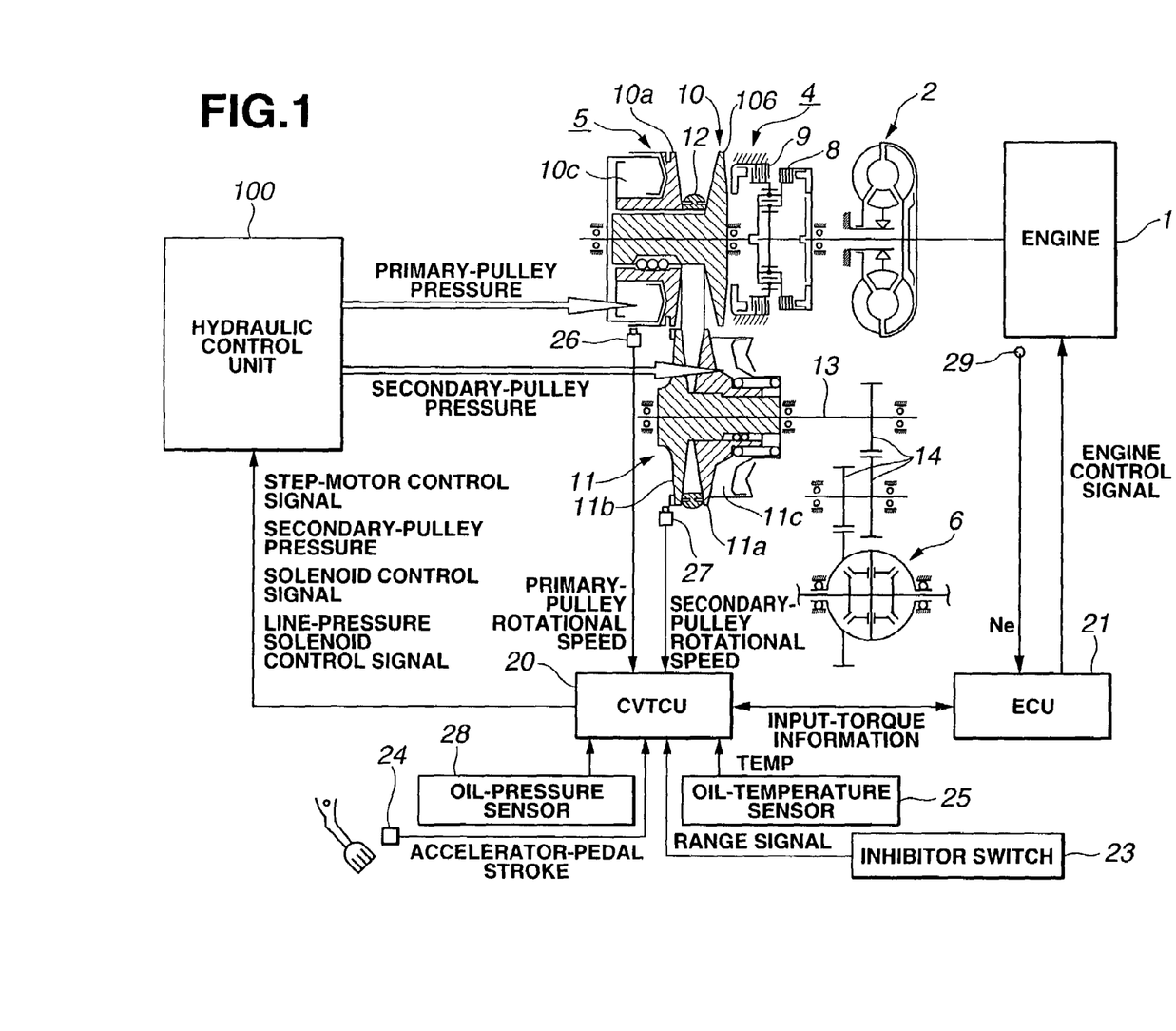
FIG. 1 is a block diagram showing a V-belt type CVT to which the present invention is applied.

Referring to the drawings, a description is made about a system for controlling an automatic transmission embodying the present invention. First, referring to FIG. 1, the structure of the control system is described. Referring to FIG. 1, a V-bent type CVT 5 is coupled to an engine 1 through a torque converter 2 with a lockup clutch and a forward/reverse switching mechanism 4. The CVT 5 comprises a pair of variable pulleys, i.e. a primary pulley 10 coupled to an input shaft and a secondary pulley 11 coupled to an output shaft 13. The variable pulleys 10,11 are coupled together through a V-belt 12. The output shaft 13 is coupled to a differential gear 6 through an idler gear 14 and an idler shaft.

The shift ratio of the CVT 5 and the contact friction of the V-belt 12 are controlled by a hydraulic control unit (HCU)

100 responsive to a command of a CVT control unit (CVTCU) 20. The CVTCU 20 determines the shift ratio and the contact friction in accordance with input-torque information derived from an engine control unit (ECU) 21 for controlling the engine 1 and signals output from various sensors and the like as will be described later.

The primary pulley 10 comprises a stationary conical plate 10b rotating together with the output shaft 13 and a movable conical plate 10a disposed opposite to the stationary conical plate 10b to form a V-shaped pulley groove and being axially movable in accordance with the hydraulic pressure or primary pressure acting on a primary-pulley cylinder chamber 10c.

The secondary pulley 11 comprises a stationary conical plate 11b rotating together with the output shaft 13 and a movable conical plate 11a disposed opposite to the stationary conical plate 11b to form a V-shaped pulley groove and being axially movable in accordance with the hydraulic pressure or secondary pressure acting on a secondary-pulley cylinder chamber 11c.

The primary-pulley cylinder chamber 10c and the secondary-pulley cylinder chamber 11c have the same pressure acting area.

Drive torque input from the engine 1 is provided to the CVT 5 through the torque converter 2 and the forward/reverse switching mechanism 4, which is transferred from the primary pulley 10 to the secondary pulley 11 through the V-belt 12. At that time, by axially displacing the movable conical plates 10a, 11a of the primary and secondary pulleys 10, 11 to change the contact radius with respect to the V-belt 12, the conversion ratio between the primary and secondary pulleys 10, 11 can be changed continuously.

The shift ratio of the CVT 5 and the contact friction of the V-belt 12 are controlled by the HCU 100.

Figure 2:
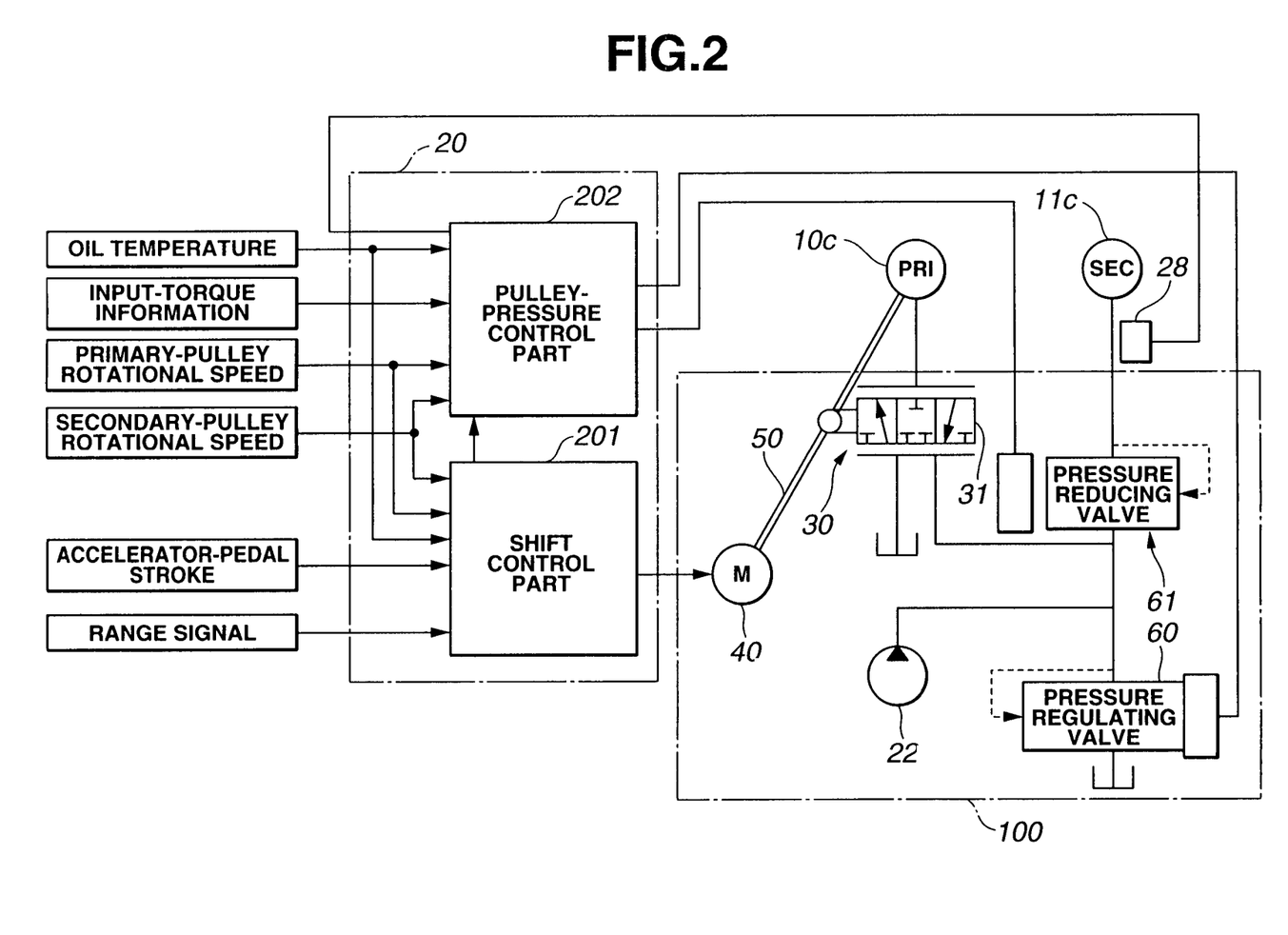
FIG. 2 is a diagram similar to FIG. 1, showing a hydraulic control unit and a CVT control unit.

Referring to FIG. 2, the HCU 100 comprises essentially a pressure regulating valve or third valve 60 for controlling a line pressure $P_L$ provided from an oil pump 22, a shift control valve or first valve 30 for controlling the hydraulic pressure or primary pressure within the primary-pulley cylinder chamber 10c, and a pressure reducing valve or second valve 61 for controlling the hydraulic pressure or secondary pressure within the secondary-pulley cylinder chamber 11c.

The shift control valve 30 is connected to a serve link 50 constituting a mechanical feedback mechanism, and is driven by a stepping motor 40 coupled to one end of the servo link 50. The shift control valve 30 receives feedback of the groove width, i.e. actual shift ratio, from the movable conical plate 10a of the primary pulley 10 coupled to another end of the servo link 50.

A line-pressure control circuit comprises pressure regulating valve 60 with a solenoid for regulating pressure oil supplied from the oil pump 22 so as to obtain a predetermined line pressure $P_L$ corresponding to operating conditions and responsive to a command, e.g. duty signal, of the CVTCU 20.

The line pressure $P_L$ is supplied to the shift control valve 30 for controlling the primary pressure and the pressure reducing valve 61 with solenoid for controlling the secondary pressure.

The conversion ratio between the primary and secondary pulleys 10, 11 is controlled by the stepping motor 40 driven responsive to a shift-command signal of the CVTCU 20. Specifically, a spool 31 of the shift control valve 30 is driven in accordance with displacement of the servo link 50 operated responsive to the stepping motor 40, so that the line pressure $P_L$ supplied to the shift control valve 30 is regulated to the primary pressure, which is provided to the primary pulley 10 to variably control the groove width, thus achieving setting of a predetermined shift ratio.

The shift control valve 30 carries out supply and discharge of the hydraulic pressure from the primary-pulley cylinder chamber 10c through displacement of the spool 31 to regulate the primary pressure so as to achieve a target shift ratio commanded at the drive position of the stepping motor 40. When shift is completed actually, the spool 31 is closed in accordance with displacement of the servo link 50.

Referring to FIG. 1, the CVTCU 20 inputs rotational-speed signals of a primary-pulley rotational-speed sensor 26 for sensing the rotational speed of the primary pulley 10 and a secondary-pulley rotational-speed sensor 27 for sensing the rotational speed of the secondary pulley 11, a pressure signal of a hydraulic-pressure sensor 28 for sensing the secondary pressure within the secondary-pulley cylinder chamber 11c, a select-position signal of an inhibitor switch 23, a stroke or accelerator-pedal-opening signal of an operation-amount sensor 24 for sensing the operation amount of an accelerator pedal actuated by a driver, and a temperature signal of an oil-temperature sensor 25 for sensing the oil temperature in the CVT 5, thus variably controlling the shift ratio of the CVT 5 and the contact friction of the V-belt 12. The CVTCU 20 also receives signals of an engine-speed sensor 29 for sensing the engine speed and a throttle-opening sensor 32 for sensing the throttle-valve opening through the ECU 21.

The CVTCU 20 comprises a shift control part 201 for determining a target shift ratio in accordance with the vehicle velocity and the stroke of the accelerator pedal and controlling an actual shift ratio toward the target shift ratio by driving the stepping motor 40, and a pulley-pressure or hydraulic-pressure control part 202 for controlling thrust or contact friction of the primary and secondary pulleys 10, 11 in accordance with input torque, shift ratio, oil temperature, shift velocity and the like.

The pulley-pressure control part 202 determines a target value of the line pressure $P_L$ in accordance with input-torque information, the shift ratio obtained from primary-pulley rotational speed and secondary-pulley rotational speed, and the oil temperature, and controls the line pressure $P_L$ by driving the solenoid of the pressure regulating valve 60. Moreover, the control part 202 determines a target value of the secondary pressure, and controls the secondary pressure through feedback control or closed-loop control by driving the solenoid of the pressure reducing valve 61 in accordance with a detected value of the hydraulic-pressure sensor 28 and the target value.

Figure 3:
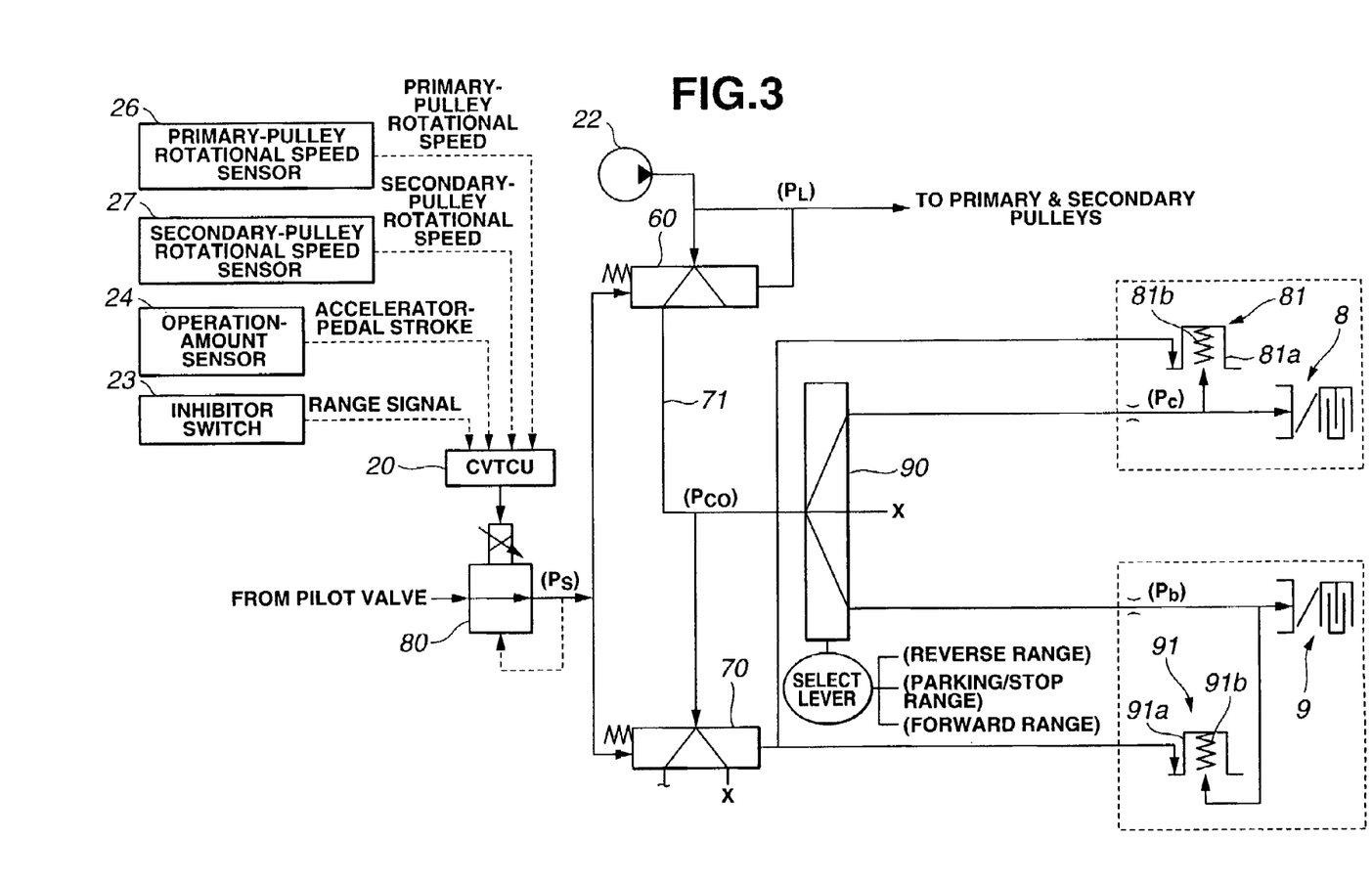
FIG. 3 is a diagram showing a hydraulic circuit for a forward clutch and a reverse brake and a line-pressure control circuit.

Referring to FIG. 3, the structure of the forward/reverse switching mechanism 4 is described. FIG. 3 shows a hydraulic circuit for engaging and releasing a forward clutch 8 and a reverse brake 9 of the forward/reverse switching mechanism 4 by ON/OFF of the engagement pressure and a control circuit of the line pressure $P_L$.

During control of the line pressure $P_L$ carried out by the pressure regulating valve 60, excess oil is provided from the valve 60 to a circuit 71. By the medium of excess oil, a clutch regulating valve 70 regulates the hydraulic pressure within the circuit 71 to a predetermined clutch source pressure $P_{CO}$.

Figure 4:
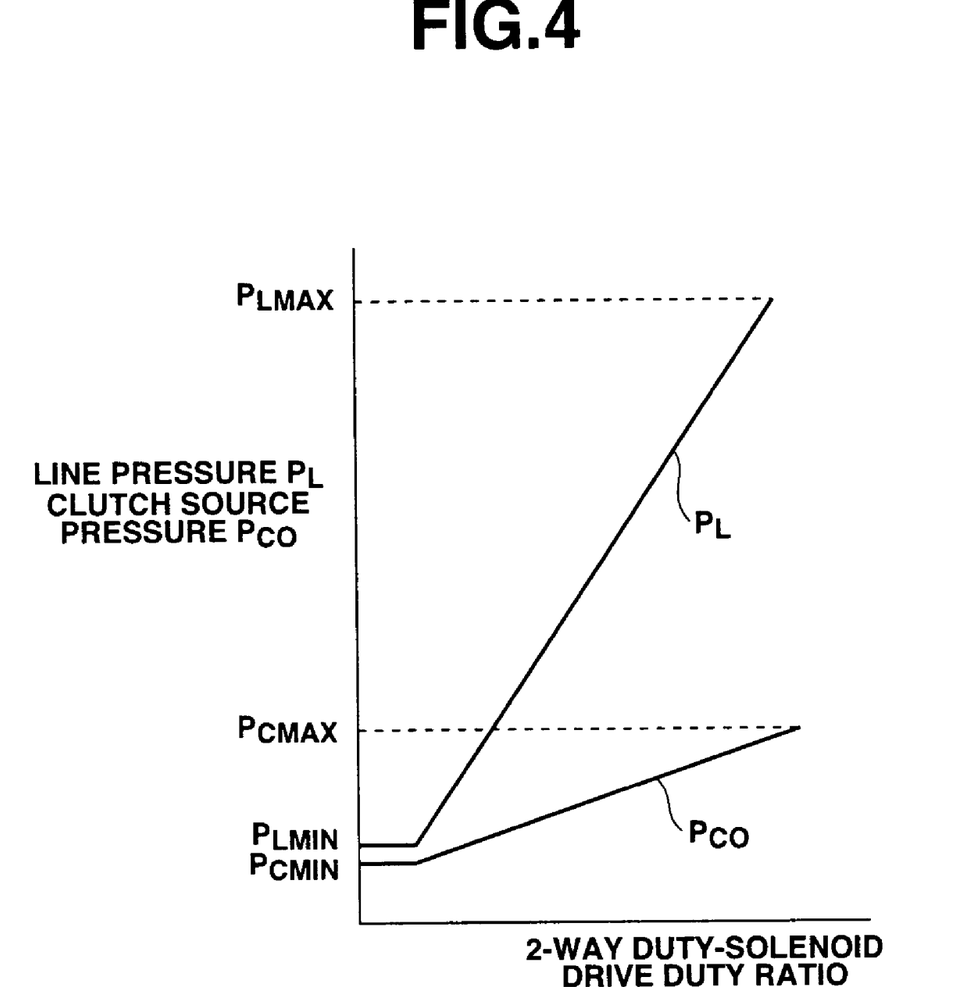
FIG. 4 is a graph illustrating the relationship between the solenoid drive duty and the line pressure and clutch source pressure.

The pressure regulating valve 60 and the clutch regulating valve 70 are responsive to a control pressure $P_S$ which a 2-way linear solenoid 80 produces from a constant pilot pressure of a pilot valve, not shown, in accordance with a duty D, i.e. 2-way linear-solenoid drive duty D, to control the line pressure $P_L$ and the clutch source pressure $P_{CO}$ in accordance with the control pressure $P_S$ and the 2-way linear-solenoid drive duty D and with reference to a map shown in FIG. 4, for example.

Referring to FIG. 4, the line pressure $P_L$ varies between a minimum value $P_{LMIN}$ and a maximum value $P_{LMAX}$ in accordance with the 2-way linear-solenoid drive duty D as shown in FIG. 4, whereas the clutch source pressure $P_{CO}$ varies between a minimum value $P_{CMIN}$ and a maximum value $P_{CMAX}$ in accordance with the 2-way linear-solenoid drive duty D as shown in FIG. 4.

The clutch source pressure $P_{CO}$ is supplied to a select switching valve 90. In the forward range, the select switching valve 90 provides the clutch source pressure $P_{CO}$ to the forward clutch 8 to produce an engagement pressure Pc thereof and drain an engagement pressure Pb of the reverse brake 9. In the reverse range, the select switching valve 90 provides the clutch source pressure $P_{CO}$ to the reverse brake 9 to produce the engagement pressure Pb and drain the engagement pressure Pc of the forward clutch 8. In the parking/stop range, with the clutch source pressure $P_{CO}$ shut off, the select switching valve 90 drains both the engagement pressure Pc of the forward clutch 8 and the engagement pressure Pb of the reverse brake 9.

Figure 5:
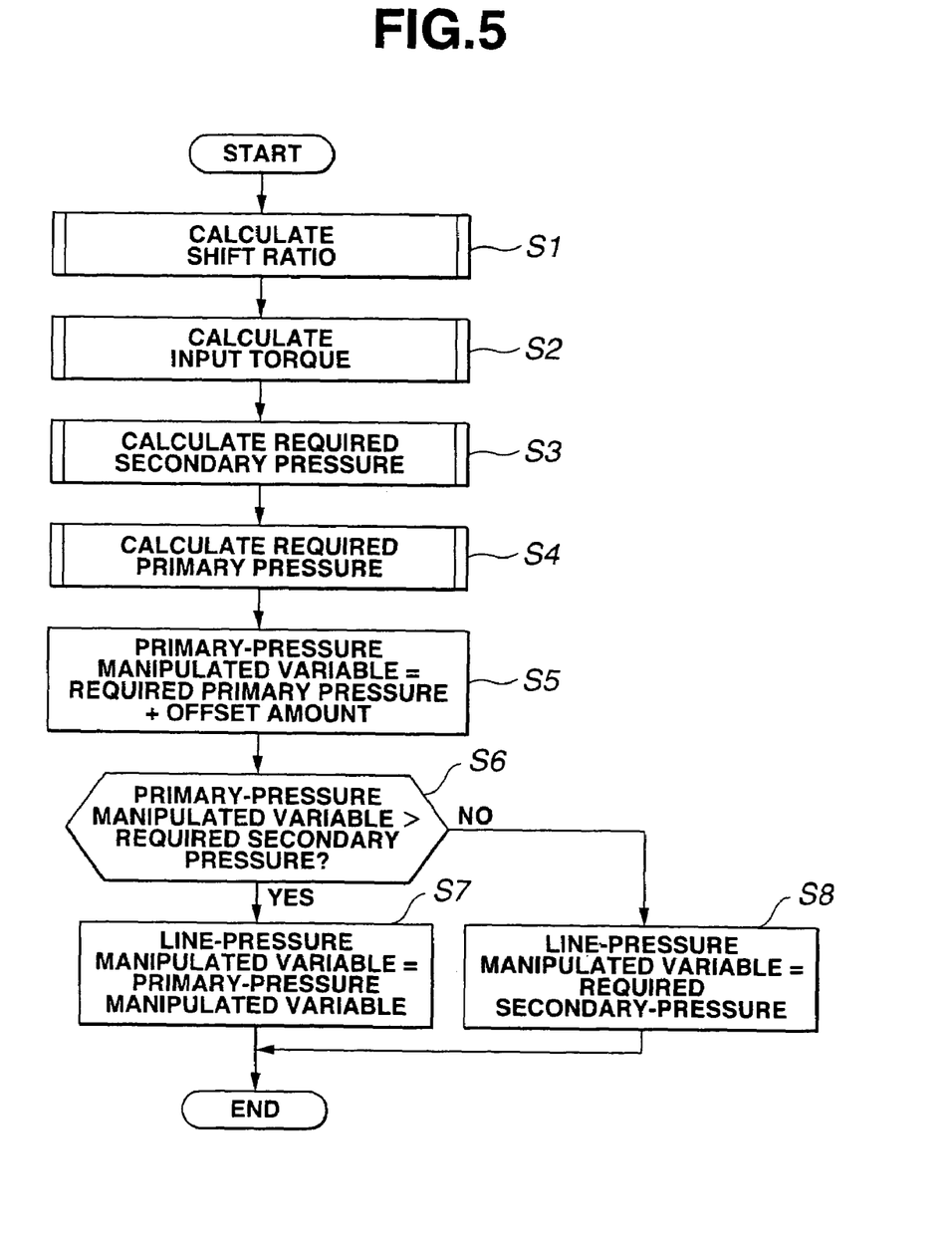
FIG. 5 is a flow chart showing operation of the embodiment.

Next, operation of the control system is described. Referring to FIG. 5, a description is made about line-pressure control carried out by the CVTCU 20.

At a step S1, an actual shift ratio is calculated in accordance with the ratio between primary-pulley rotational speed sensed by the primary-pulley rotational-speed sensor 26 and secondary-pulley rotational speed sensed by the secondary-pulley rotational-speed sensor 27.

At a step S2, input torque to the CVT 5 is calculated in accordance with input-torque information out of the ECU 21.

Figure 6:
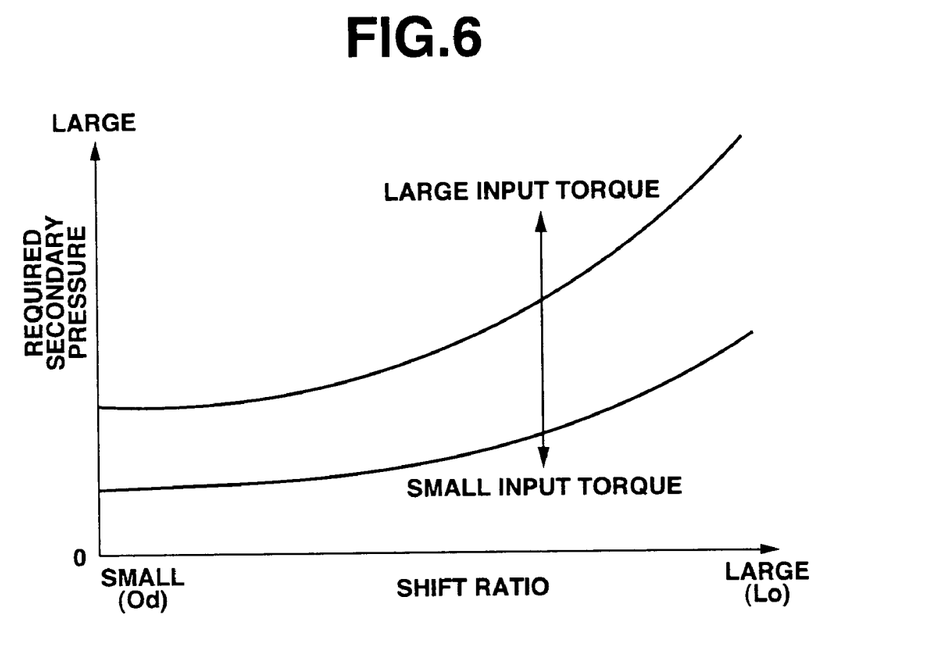
FIG. 6 is a map illustrating a characteristic of a required secondary pressure in accordance with the shift ratio and input torque.

At a step S3, a required secondary pressure is calculated in accordance with the actual shift ratio and input torque and with reference to a map shown in FIG. 6. This map is previously set in such a way that as the shift ratio is smaller (Od side), the hydraulic pressure is lower, whereas as the shift ratio is greater (Lo side), the hydraulic pressure is higher, and that as input torque is greater, the hydraulic pressure is higher, whereas input torque is smaller, the hydraulic pressure is lower.

Figure 7:
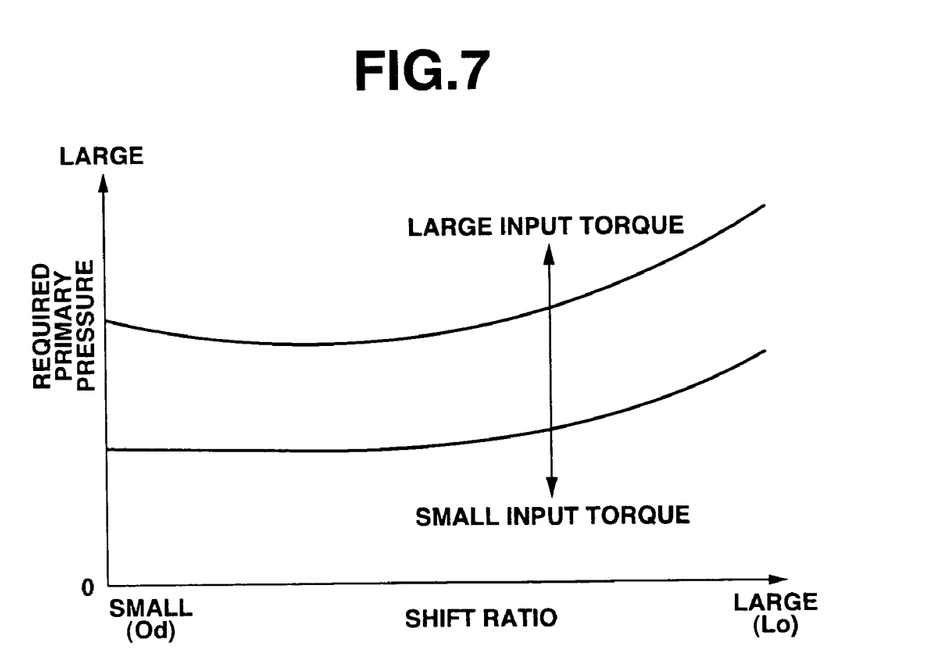
FIG. 7 is a map similar to FIG. 6, illustrating a characteristic of a required primary pressure in accordance with the shift ratio and input torque.

At a step S4, a required primary pressure is calculated in accordance with the shift ratio and input torque and with reference to a map shown in FIG. 7. This map is previously set in such a way that as the shift ratio is smaller, the hydraulic pressure is lower, whereas as the shift ratio is greater, the hydraulic pressure is higher, and that as input torque is greater, the hydraulic pressure is higher, whereas as input torque is smaller, the hydraulic pressure is lower. That is, the primary pressure is set to be relatively higher on the side of small shift ratio, and relatively lower on the side of large shift ratio with respect to the required secondary pressure. Note that an inverse relationship of magnitude is formed between the required primary pressure and the required secondary pressure in some cases.

At a step S5, a primary-pressure manipulated variable or primary-pressure target value is calculated in accordance with the following formula:

primary-pressure manipulated variable=required primary pressure+offset amount where the offset amount is a value (hydraulic-pressure additional value) set in accordance with a characteristic of the shift control valve 30, i.e. it is a value for compensating a pressure loss since a pressure-loss characteristic is not fully proportional to the hydraulic pressure.

At a step S6, it is determined whether or not the primary-pressure manipulated variable is greater than the required secondary pressure. If it is determined that the primary-pressure manipulated variable>the required secondary pressure, control proceeds to a step S7, whereas the primary-pressure manipulated variable≦the required secondary pressure, control proceeds to a step S8.

At the step S7, a line-pressure manipulated variable is set equal to the primary-pressure manipulated variable, then control comes to an end.

At the step S8, the line-pressure manipulated variable is set equal to the required secondary pressure, then control comes to an end.

As described above, the greater of the primary-pressure manipulated variable and the required secondary pressure is obtained as line-pressure manipulated variable or target hydraulic pressure, which is then converted to a controlled variable, such as duty signal, for driving the solenoid of the pressure regulating valve 60, actuating the pressure regulating valve 60.

Figure 8:
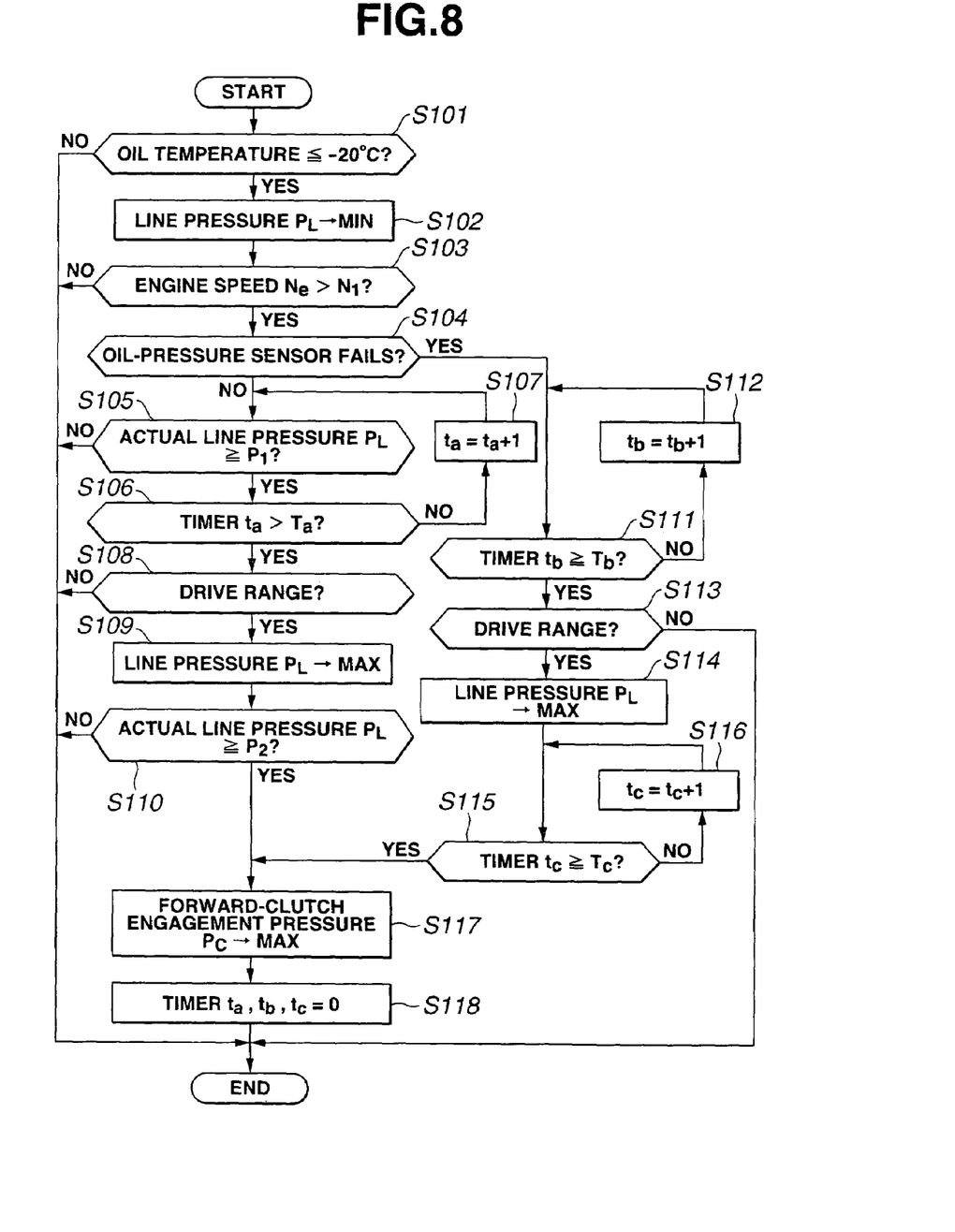
FIG. 8 is chart similar to FIG. 5, showing operation of the embodiment.

Referring to FIG. 8, a description is made about line-pressure control at the time of ultra-low temperature start carried out by the CVTCU 20.

At a step S101, it is determined whether or not the oil temperature is equal to or lower than −20° C. in accordance with a detected value of the oil-temperature sensor 25. If it is determined that oil temperature≦−20° C., control proceeds to a step S102, whereas if it is determined that oil temperature>−20° C., control comes to an end.

At a step S102, a command is provided to the pressure regulating valve 60 to minimize an indicated value of the line pressure $P_L$. Moreover, a command is provided to the pressure reducing valve 61 to maximize an indicated value of the secondary pressure.

At a step S103, it is determined whether or not an engine speed Ne is greater than a predetermined speed $N_1$ in accordance with an output signal of the engine-speed sensor 29. If it is determined that Ne>$N_1$, control proceeds to a step S104, whereas if it is determined that Ne≦$N_1$, control comes to an end.

At a step S104, it is determined whether or not the hydraulic-pressure sensor 28 fails. If it is determined that the hydraulic-pressure sensor 28 fails, control proceeds to a step S111, whereas it is determined that the hydraulic-pressure sensor 28 does not fail, control proceeds to a step S105.

At a step S105, it is determined whether or not the actual line pressure $P_L$ is equal to or greater than an ultra-low pressure set value $P_1$ in accordance with a detected value of the hydraulic-pressure sensor 28. Here, the hydraulic-pressure sensor 28 senses the secondary pressure. Since the pressure reducing valve 61 is driven to maximize the secondary pressure at the step S102, the actual secondary pressure is equal to the actual line pressure $P_L$. If it is determined that actual secondary pressure≧$P_1$, control proceeds to a step S106, whereas it is determined that actual secondary pressure<$P_1$, control comes to an end.

At a step S106, it is determined whether or not a timer $t_a$ is greater than a line-pressure low-pressure control command set time $T_a$. If it is determined that $t_a$>$T_a$, control proceeds to a step 108, whereas it is determined that $t_a$≦$T_a$, control proceeds to a step S107.

At the step S107, the timer $t_a$ is incremented by 1.

At the step S108, it is determined whether or not the drive range is selected in accordance with a range signal of the inhibitor switch 23. If it is determined that the drive range is selected, control proceeds to a step S109, whereas it is determined that the drive range is not selected, control comes to an end.

At the step S109, a command is provided to the pressure regulating valve 60 so as to maximize the indicated value of the line pressure $P_L$.

At a step S110, it is determined whether or not the actual line pressure $P_L$ is equal to or greater than a set value $P_2$. If it is determined that $P_L \geq P_2$, control proceeds to a step S117, whereas if it is determined that $P_L < P_2$, control comes to an end.

At the step S111, it is determined whether or not a timer $t_b$ is equal to or greater than a first set time $T_b$. If it is determined that $t_b \geq T_b$, control proceeds to a step 113, whereas it is determined that $t_b < T_b$, control proceeds to a step S112.

At the step S112, the timer $t_b$ is incremented by 1.

At the step S113, it is determined whether or not the drive range is selected in accordance with a range signal of the inhibitor switch 23. If it is determined that the drive range is selected, control proceeds to a step S114, whereas it is determined that the drive range is not selected, control comes to an end.

At the step S114, a command is provided to the pressure regulating valve 60 so as to maximize the indicated value of the line pressure $P_L$.

At a step S115, it is determined whether or not a timer $t_c$ is equal to or greater than a second set time $T_c$. If it is determined that $t_c \geq T_c$, control proceeds to a step 117, whereas it is determined that $t_c < T_c$, control proceeds to a step S116.

At the step S116, the timer $t_c$ is incremented by 1.

At the step S117, a command is provided to the clutch regulating valve 70 so as to maximize an indicated value of the forward-clutch engagement pressure $P_c$.

The timers $t_a$, $t_b$, $t_c$ are initialized, then control comes to an end.

Figure 9:
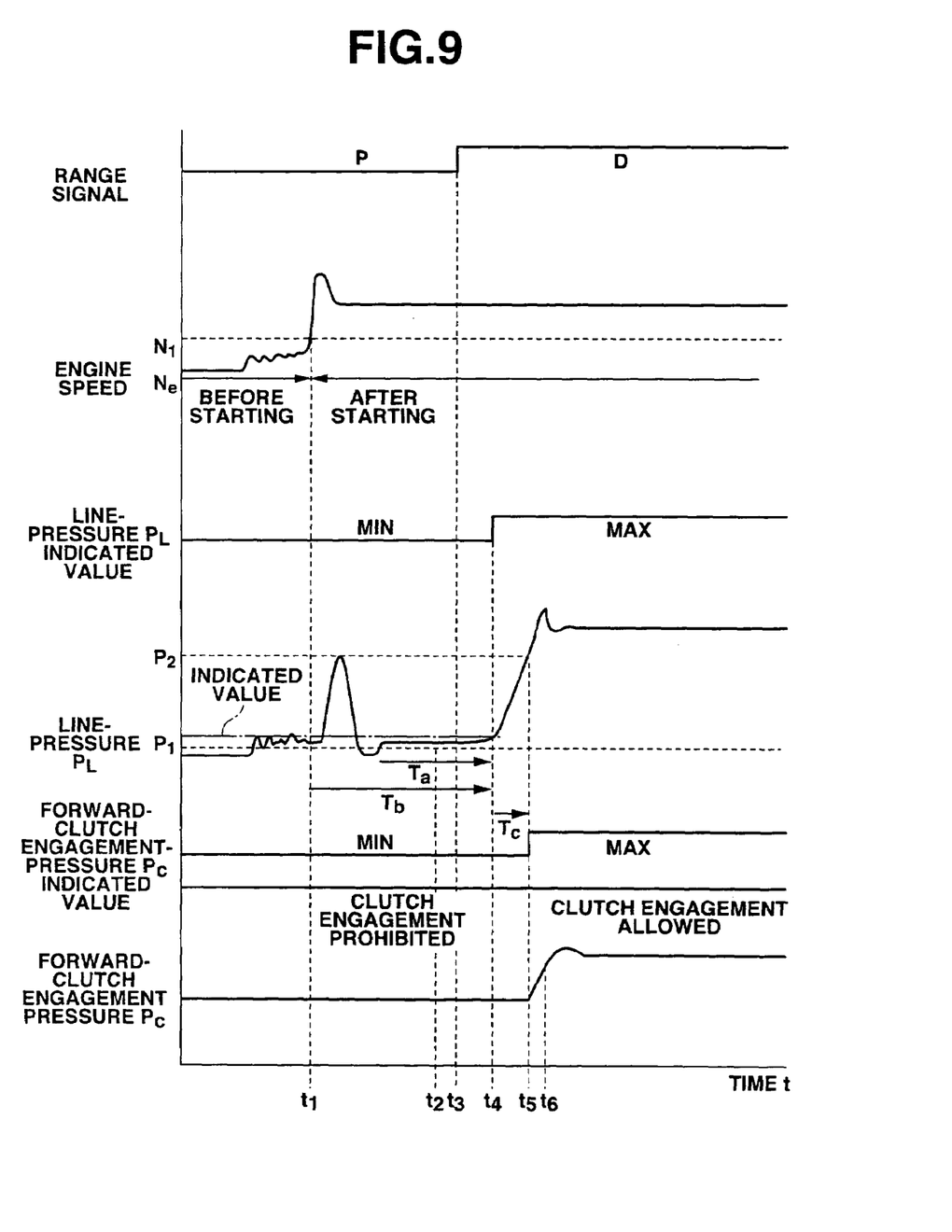
FIG. 9 is a time chart illustrating operation of line-pressure control at the time of ultra-low temperature start.

Referring to FIG. 9, a description is made about operation of line-pressure control at the time of ultra-low temperature start.

At an instant t1, the engine speed Ne exceeds predetermined speed N1 by cranking. At that time, referring to FIG. 8, control is carried out along flow of step S101→step S102→step S103→step S104. That is, at the step S101, it is determined that oil temperature $\leq -20°$ C., and at the step S102, the indicated value of the line pressure $P_L$ is minimized. Then, at the step S103, it is determined that engine speed Ne>predetermined speed $N_1$.

At the step S104, flow is bifurcated in accordance with presence or absence of a failure of the hydraulic-pressure sensor 28. If it is determined that the hydraulic-pressure sensor 28 fails, control proceeds from the step S104 through the step S111 to the step S112. That is, at the step S111, it is determined that timer $t_b$<first set time $T_b$, and the step S112, the timer $t_b$ is incremented by 1.

One the other hand, at the step S104, if it is determined that the hydraulic-pressure sensor 28 does not fail, control proceeds from the step S104 to the step S105. At the step S105, it is determined that actual line pressure $P_L$<ultra-low pressure set value $P_1$.

At an instant t2, the actual line pressure $P_L$ reaches line-pressure ultra-low set value $P_1$. At that time, referring to FIG. 8, control is carried out along flow of step S105→step S106→step S107. That is, at the step S105, it is determined that actual line pressure $P_L \geq$ ultra-low pressure set value $P_1$, and at the step S106, it is determined that timer $t_a \leq$ line-pressure low-pressure control command set time $T_a$. Then, at the step S107, the timer $t_a$ is incremented by 1.

At an instant t3, the select range is changed from the parking range to the drive range.

At an instant t4, if the hydraulic-pressure sensor 28 does not fail, time longer than the line-pressure low-pressure control command set time $T_a$ elapses after the actual line pressure $P_L$ reaches ultra-low pressure set value $P_1$. Thus, referring to FIG. 8, control is carried out along flow of step S106→step S108→step S109→step S110. That is, at the step S108, it is determined that the drive range is selected, and at the step S109, the indicated value of the line pressure $P_L$ is maximized. Then, at the step S110, it is determined that actual line pressure $P_L$<set value $P_2$.

On the other hand, even if the hydraulic-pressure sensor 28 fails, the timer $t_b$ reaches first set time $T_b$. Thus, referring to FIG. 8, control is carried out along flow of step S111→step S113→step S114→step S115→step S116. That is, at the step S113, it is determined that the drive range is selected, and at the step S114, the indicated value of the line pressure $P_L$ is maximized. At the step S115, it is determined that timer $t_c$<second set time $T_c$. Then, at the step S116, the timer $t_c$ is incremented by 1.

At an instant t5, if the hydraulic-pressure sensor 28 does not fail, the actual line pressure $P_L$ reaches set time $P_2$. Thus, referring to FIG. 8, control is carried out along flow of step S110→step S117→step S118. That is, at the step S117, the indicated value of the forward-clutch engagement pressure Pc is maximized, and at the step S118, timers $t_a$, $t_b$, $t_c$ are initialized.

On the other hand, even if the hydraulic-pressure sensor 28 fails, the timer $t_c$ reaches second set time $T_c$. Thus, referring to FIG. 8, control is carried out along flow of step S115→step S117→step S118.

At an instant t6, the forward clutch 8 is engaged. At that time, the line pressure $P_L$ is already maximized, so that the engagement pressure of the forward clutch 8 cannot exceed the pulley cramp pressure due to response lag of the hydraulic pressure.

Next, an effect of the embodiment is described. In the embodiment, at the time of ultra-low temperature start with the oil temperature of $-20°$ C. or less, control is carried out such that when the state that the actual line pressure $P_L$ is equal to or greater than ultra-low set value $P_1$ continues for a period longer than the line-pressure low-pressure control command set time $T_a$, it is determined that the line pressure $P_L$ is under regulation, maximizing the indicated value of the line pressure $P_L$. Specifically, with the pressure regulating valve 60 being supplied with the hydraulic pressure obtained from the source pressure of the oil pump 22 and capable of being reduced up to the "design maximum value" of the line pressure $P_L$, the line pressure $P_L$ is maximized. Thus, an overshoot of the line pressure $P_L$ with respect to the "design maximum value" is restrained within a small value to prevent occurrence of an excessive pulley cramp pressure, allowing an enhancement in the durability of the pulleys 10, 11.

Further, when the hydraulic-pressure sensor 28 fails, control is carried out such that when the first set time $T_b$ elapses after the engine speed Ne exceeds predetermined speed $N_1$, it is determined that the line pressure $P_L$ is under regulation, maximizing the indicated value of the line pressure $P_L$. Thus, even when the actual line pressure $P_L$ cannot be detected, an overshoot of the line pressure $P_L$ can be restrained.

Still further, before the actual line pressure $P_L$ reaches set value $P_2$, the indicated value of the forward-clutch engagement pressure Pc is not maximized. This can prevent engagement of the forward clutch 8 before increasing of the actual line pressure $P_L$ due to response lag of the hydraulic pressure, and thus occurrence of slippage of the V-belt 12.

Furthermore, when the second set time $T_c$ elapses after determining that the line pressure $P_L$ is under regulation, the indicated value of the forward-clutch engagement pressure Pc is maximized. This can prevent occurrence of slippage of the V-belt 12 even when the actual line pressure $P_L$ cannot be detected due to failure of the hydraulic-pressure sensor 28.

According to the invention in claim 1, the second indicated value is provided when it is determined that the actual value of the line pressure is equal to or greater than the predetermined value, and when it is determined that the actual value as determined is held for the period longer than the low-pressure control set time. Referring to FIG. 9, at engine start, the line pressure overshoots largely after start of cranking due to increase in the engine speed, then undershoots slightly, coming into the regulated or stabilized state wherein the line pressure is equal to or greater than ultra-low set value and smaller than indicated value of the line pressure. That is, it is set as a low-pressure control set time a time required from start of engine cranking to completion of an overshoot of the line pressure due to increase in the engine speed. And when it is determined that the actual value of the line pressure is equal to or greater than the predetermined value or ultra-low set value, and that the actual value as determined is held for the period longer than the low-pressure control set time, It is determined that the line pressure is under regulation. Thus, erroneous determination can be prevented that an overshoot due to cranking is caused by regulation of the line pressure.

And the indicated value of the line pressure is set at a normal value after regulation of the line pressure. With this, when a command of the indicated value of the line pressure to the line-pressure control circuit is switched from a line-pressure low-pressure control command to a line-pressure normal control command, an overshoot of the line pressure exceeding the "design maximum value" can be reduced, achieving a reduction in abrupt load variations applied to the transmission, resulting in enhanced durability thereof. Note that the ultra-low set value of the line pressure is set considering dispersion of the hydraulic pressure and a sensing error of the hydraulic-pressure sensing device for the actual line pressure predicted when the indicated value of the line pressure is ultra low. The ultra-low set value is lower than the indicated value.

According to the invention in claim 2, the V-belt type CVT is free from occurrence of an excessive pulley cramp pressure due to overshoot of the line pressure. The system of the earlier art has greater overshoot of the secondary pressure, and thus provides excessive cramp pressure to the secondary pulley, leading to possibility of causing damage to the pulleys and the V-belt. On the other hand, the invention in claim 2 allows a reduction in damage to be caused to the pulleys and the V-belt, resulting in enhanced durability thereof.

In the V-belt type CVT wherein the secondary pressure is sensed by the hydraulic-pressure sensor, and the line pressure is reduced through the pressure reducing valve in accordance with the sensed value and a target value to feedback control the secondary pressure of the secondary pulley, setting of an indicated value of the pressure reducing valve to be greater than that of the line pressure provides a condition of "actual secondary pressure"="actual line pressure", allowing direct detection of the actual line pressure, removing additional arrangement of a hydraulic-pressure sensor for sensing the line pressure.

According to the invention in claim 3, even if the actual line pressure cannot be sensed due to failure of the hydraulic-pressure sensing device, the regulated state of the line pressure can be determined from the engine speed and the first set time, resulting in retrained overshoot of the line pressure. Note that the first set time is a time predicted to be required from an instant that the engine speed exceeds a predetermined speed to an instant that the second indicated value is provided when it is determined that the actual value of the line pressure is equal to or greater than the predetermined value, and when it is determined that the actual value as determined is held for the period longer than the low-pressure control set time. The first set time can be estimated from experimental data and the like. Optionally, the first set time may be obtained by measurement such that when the hydraulic-pressure sensor functions normally, it is measured and recorded a time required from an instant that the engine speed exceeds a predetermined speed to an instant that the second indicated value is provided when it is determined that the actual value of the line pressure is equal to or greater than the predetermined value, and when it is determined that the actual value as determined is held for the period longer than the low-pressure control set time.

According to the invention in claim 4, the engagement element is not engaged before the actual line pressure reaches a predetermined value, allowing prevention of engagement of the engagement element before increasing of the actual line pressure due to response lag of the hydraulic pressure, and thus occurrence of slippage of the V-belt. Note that the predetermined value of the actual line pressure is a value which allows sufficient pulley cramp pressure. The predetermined value may be greater than a maximum indicated value of the clutch pressure to be supplied to the engagement element.

According to the invention in claim 5, the maximum indicated value of the line pressure is provided when it is determined that the second set time elapses after the line pressure is under regulation. Thus, even if the actual line pressure cannot be sensed due to failure of the hydraulic-pressure sensing device, it can be prevented engagement of the engagement element before increasing the line pressure, and thus occurrence of slippage of he V-belt. Note that the second set time is a time predicted to be required from an instant that the second indicated value of the line pressure is provided to the control circuit to an instant that the line pressure is fully increased. The second set time can be estimated from experimental data and the like.

Having described the present invention in connection with the illustrative embodiment, it is noted that the present invention is not limited thereto, and various changes and modifications can be made without departing from the scope of the present invention.

By way of example, in the illustrative embodiment, when the hydraulic-pressure sensor 28 does not fail, control is carried out such that when the actual line pressure $P_L$ exceeds set value $P_2$, the forward-clutch engagement pressure Pc is maximized. On the other hand, when the hydraulic-pressure sensor 28 fails, control is carried out such that when the second se time $T_C$ elapses after determining that the line pressure $P_L$ is under regulation, the forward-clutch engagement pressure Pc is maximized. Optionally, when the hydraulic-pressure sensor 28 does not fail, control can be carried out such that when the actual line pressure $P_L$ reaches set value $P_2$, or when the second set time $T_c$ elapses after determining that the line pressure $P_L$ is under regulation, the forward-clutch engagement pressure Pc is maximized.

The entire teachings of Japanese Patent Application P2002-285496 filed Sep. 30, 2002 are incorporated thereby by reference.

What is claimed is:

1. A system for controlling an automatic transmission, comprising:
   a source of a line pressure;
   an oil-temperature sensor which senses a temperature of a transmission oil;
   an engine-speed sensor which senses an engine speed;
   a hydraulic-pressure sensing device which senses an actual value of the line pressure;
   a control circuit which controls the line pressure; and
   a control unit which controls the control circuit, the control unit being configured to:
   determine that engine cranking starts when the engine speed is greater than a predetermined speed;
   set as a low-pressure control set time a time required from start of engine cranking to completion of an overshoot of the line pressure due to increase in the engine speed;
   determine that the actual value of the line pressure is equal to or greater than a predetermined value;
   determine that the actual value as determined is held for a period longer than the low-pressure control set time; and
   provide first and second indicated values of the line pressure to the control circuit when the transmission-oil temperature at engine start is equal to or smaller than a predetermined temperature,
   the first indicated value being smaller than the second indicated value,
   the first indicated value being provided when at least a range other than a drive range is selected,
   the second indicated value being provided when the drive range is selected, the second indicated value being provided when it is determined that the actual value of the line pressure is equal to or greater than the predetermined value, and when it is determined that the actual value as determined is held for the period longer than the low-pressure control set time.

2. The system as claimed in claim 1, the transmission comprising a V-belt type CVT including a V-belt and primary and secondary pulleys holding the V-belt, the system further comprising:
   a first valve which controls a primary pressure of the primary pulley;
   a second valve which controls a secondary pressure of the secondary pulley;
   a third valve which controls the line pressure to be supplied to the first and second valves; and
   a hydraulic-pressure sensor which senses an actual value of the secondary pressure,
   wherein the hydraulic-pressure sensing device comprises the hydraulic-pressure sensor.

3. The system as claimed in claim 1, wherein the control unit is further configured to:
   determine that the hydraulic-pressure sensing device fails; and
   determine that a first set time elapses after it is determined that engine cranking starts,
   wherein when it is determined that the hydraulic-pressure sensing device fails, and when it is determined that the first set time elapses, the second indicated value of the line pressure is provided to the control circuit.

4. The system as claimed in claim 1, wherein the control unit is further configured to provide a maximum indicated value of the line pressure to an engagement element when it is determined that the actual value of the line pressure is equal to or greater than the predetermined value after the second indicated value of the line pressure is provided to the control circuit.

5. The system as claimed in claim 4, wherein the control unit is further configured to determine that a second set time elapses after the second indicated value of the line pressure is provided to the control circuit,
   wherein the maximum indicated value of the line pressure is provided when it is determined that the second set time elapses.

6. A system for controlling an automatic transmission, comprising:
   means for producing a line pressure;
   means for sensing a temperature of a transmission oil;
   means for sensing an engine speed;
   means for sensing an actual value of the line pressure;
   a control circuit which controls the line pressure; and
   means for controlling the control circuit, the controlling means being configured to:
   determine that engine cranking starts when the engine speed is greater than a predetermined speed;
   set as a low-pressure control set time a time required from start of engine cranking to completion of an overshoot of the line pressure due to increase in the engine speed;
   determine that the actual value of the line pressure is equal to or greater than a predetermined value;
   determine that the actual value as determined is held for a period longer than the low-pressure control set time; and
   provide first and second indicated values of the line pressure to the control circuit when the transmission-oil temperature at engine start is equal to or smaller than a predetermined temperature,
   the first indicated value being smaller than the second indicated value,
   the first indicated value being provided when at least a range other than a drive range is selected,
   the second indicated value being provided when the drive range is selected, the second indicated value being provided when it is determined that the actual value of the line pressure is equal to or greater than the predetermined value, and when it is determined that the actual value as determined is held for the period longer than the low-pressure control set time.

7. A method of controlling an automatic transmission, the transmission comprising:
   a source of a line pressure;
   an oil-temperature sensor which senses a temperature of a transmission oil;
   an engine-speed sensor which senses an engine speed;
   a hydraulic-pressure sensing device which senses an actual value of the line pressure; and
   a control circuit which controls the line pressure,
   the method comprising:
   determining that engine cranking starts when the engine speed is greater than a predetermined speed;
   setting as a low-pressure control set time a time required from start of engine cranking to completion of an overshoot of the line pressure due to increase in the engine speed;
   determining that the actual value of the line pressure is equal to or greater than a predetermined value;

determining that the actual value as determined is held for a period longer than the low-pressure control set time; and providing first and second indicated values of the line pressure to the control circuit when the transmission-oil temperature at engine start is equal to or smaller than a predetermined temperature, the first indicated value being smaller than the second indicated value, the first indicated value being provided when at least a range other than a drive range is selected, the second indicated value being provided when the drive range is selected, the second indicated value being provided when it is determined that the actual value of the line pressure is equal to or greater than the predetermined value, and when it is determined that the determination of the actual value continues for the period longer than the low-pressure control set time.

8. The method as claimed in claim 7, the transmission comprising a V-belt type CVT including a V-belt and primary and secondary pulleys holding the V-belt, the method being carried out with:

a first valve which controls a primary pressure of the primary pulley;

a second valve which controls a secondary pressure of the secondary pulley;

a third valve which controls the line pressure to be supplied to the first and second valves; and a hydraulic-pressure sensor which senses an actual value of the secondary pressure, wherein the hydraulic-pressure sensing device comprises the hydraulic-pressure sensor.

9. The method as claimed in claim 7, further comprising:

determining that the hydraulic-pressure sensing device fails; and determining that a first set time elapses after it is determined that engine cranking starts, wherein when it is determined that the hydraulic-pressure sensing device fails, and when it is determined that the first set time elapses, the second indicated value of the line pressure is provided to the control circuit.

10. The method as claimed in claim 7, further comprising providing a maximum indicated value of the line pressure to be supplied to an engagement element when it is determined that the actual value of the line pressure is equal to or greater than the predetermined value after the second indicated value of the line pressure is provided to the control circuit.

11. The method as claimed in claim 10, further comprising determining that a second set time elapses after the second indicated value of the line pressure is provided to the control circuit, wherein the maximum indicated value of the line pressure is provided when it is determined that the second set time elapses.

* * * * *